July 10, 1934.  C. E. HILL  1,966,391
FOUR JAW VISE
Filed Dec. 5, 1933
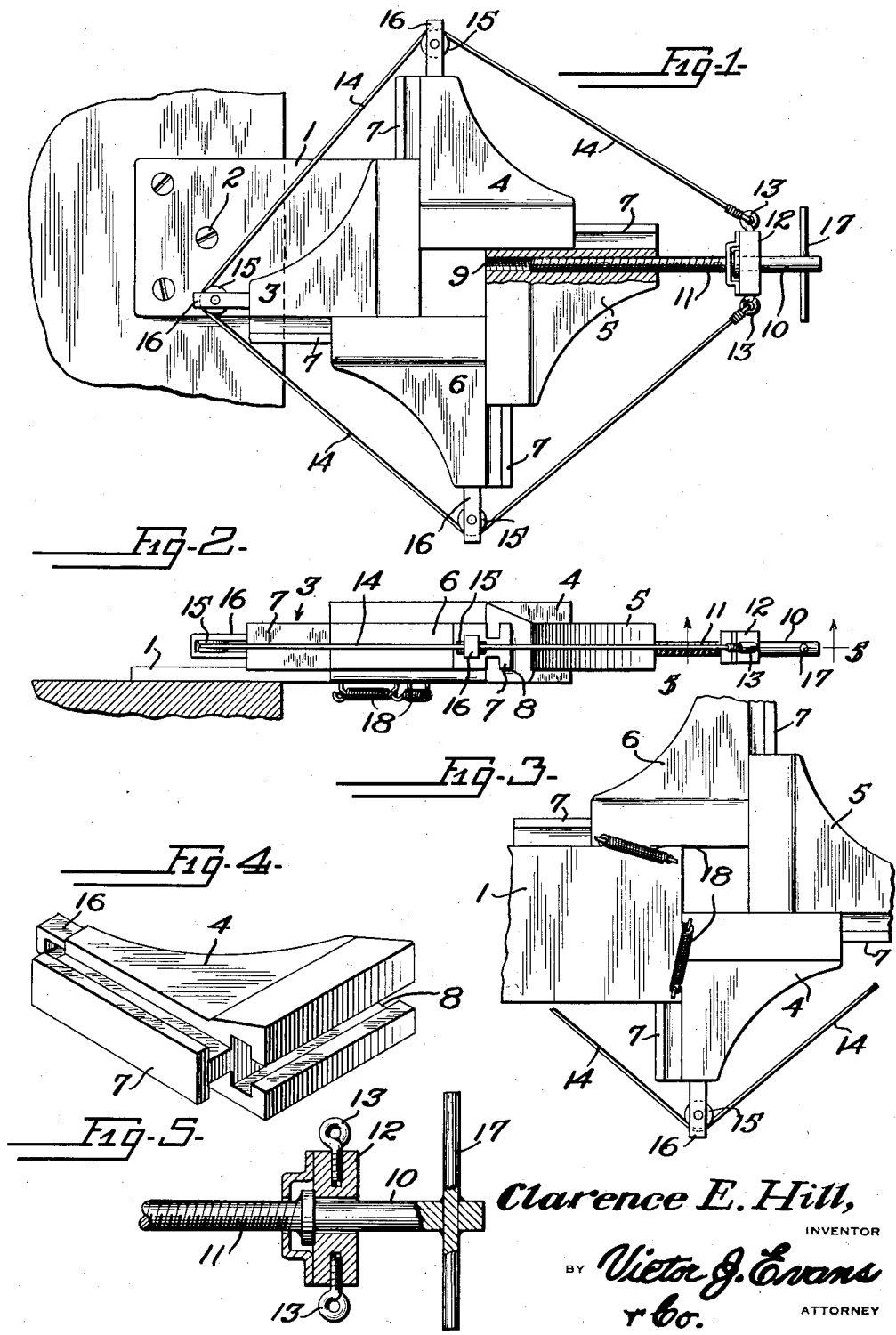
Clarence E. Hill,
INVENTOR
BY Victor J. Evans
 & Co.  ATTORNEY Patented July 10, 1934

1,966,391

UNITED STATES PATENT OFFICE 1,966,391

FOUR JAW VISE

Clarence E. Hill, Groton, Conn.

Application December 5, 1933, Serial No. 701,066

1 Claim. (Cl. 81—17)

This invention relates to vises and has for the primary object the provision of a device of the above stated character having four jaws and an operating means therefor, whereby said jaws may be easily and quickly adjusted to grip square and oblong objects to efficiently hold such objects against slipping or moving relative to the vise.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a top plan view partly in section illustrating a vise constructed in accordance with my invention.

Figure 2 is a side elevation partly in section illustrating the device.

Figure 3 is a fragmentary bottom plan view illustrating the means of moving the jaws towards each other.

Figure 4 is a perspective view illustrating one of the jaws.

Figure 5 is a fragmentary sectional view taken on the line 5—5 of Figure 2.

Referring in detail to the drawing, the numeral 1 indicates a base, preferably in the form of a plate apertured to receive fasteners for securing the plate to a support. Grouped angularly relative to each other are jaws 3, 4, 5 and 6 and the jaw 3 is suitably secured to the base 1. The jaws are of substantially triangular shape and are slidably connected to each other by tenons and grooves 7 and 8, respectively. The jaw 5 is provided with a threaded bore 9 to receive an adjusting shaft 10 equipped with feed threads 11 meshing with the threads of the bore 9. The shaft 10 has journaled thereon a sleeve 12 equipped with eye bolts 13 to which the ends of a flexible element 14 are secured. The flexible element is trained over pulleys 15 secured to extensions 16 carried by the jaws 3, 4 and 6 so that the rotation of the shaft in one direction will cause the jaws to be moved towards each other for gripping an object which may be either square or oblong in shape. To facilitate the rotation of the shaft 10 a handle 17 is provided.

Coil springs 18 are connected to the base 1 and to the jaws 4 and 6 and the tension of said springs is increased as the jaws are moved towards each other so that upon rotation of the shaft 10 in one direction to slacken the flexible element 14, the jaws will be caused to move apart.

Having described the invention, I claim:

A vise comprising four jaws arranged angularly to each other and slidably connected, a base carrying one of said jaws, a shaft threaded through one of the jaws, a collar journaled to the shaft, a flexible element connected to said collar, rollers carried by three of said jaws and having the flexible element trained thereover, a handle for said shaft for rotation thereof in either direction and when rotated in one direction is adapted to adjust the jaws towards each other and when rotated in an opposite direction is adapted to slacken the flexible element, and springs connected to a pair of said jaws for causing said jaws to move apart when the flexible element is slackened.

CLARENCE E. HILL.